United States Patent [19]

Malloy Desormeaux

[11] Patent Number: 4,671,636

[45] Date of Patent: Jun. 9, 1987

[54] FILM-ON-SPOOL SENSOR FOR TRIGGERING FILM REWIND WHEN CAMERA DOOR OPENED PREMATURELY

[75] Inventor: Stephen G. Malloy Desormeaux, Rochester, N.Y.

[73] Assignee: Eastman Kodak Company, Rochester, N.Y.

[21] Appl. No.: 869,523

[22] Filed: Jun. 2, 1986

[51] Int. Cl.⁴ .............................. G03B 1/12; G03B 1/66
[52] U.S. Cl. .................................. 354/214; 354/173.1; 354/217
[58] Field of Search ................ 354/173.1, 173.11, 214, 354/217

[56] References Cited

U.S. PATENT DOCUMENTS

| | | | |
|---|---|---|---|
| 4,251,148 | 2/1981 | Stemme et al. | 354/173 |
| 4,281,911 | 8/1981 | Engelsmann et al. | 354/173 |
| 4,297,019 | 10/1981 | Yagi et al. | 354/171 |
| 4,362,370 | 12/1982 | Iwata et al. | 354/173 |
| 4,419,001 | 12/1983 | Tominaga et al. | 354/173.1 |
| 4,460,256 | 7/1984 | Araki et al. | 354/173.11 |
| 4,494,842 | 1/1985 | Kimura et al. | 354/173.11 |
| 4,504,131 | 3/1985 | Kimura | 354/173.11 |
| 4,568,164 | 2/1986 | Sahori | 354/173.1 |

*Primary Examiner*—Michael L. Gellner
*Attorney, Agent, or Firm*—Roger A. Fields

[57] ABSTRACT

A photographic camera has a motorized film transport mechanism which is operable normally to prewind substantially the entire length of a filmstrip from a light-tight cartridge onto a take-up spool without exposing any of the frames on the filmstrip and to rewind the filmstrip one frame at a time back into the cartridge after each exposure is completed. If a rear door of the camera is accidentally or inadvertently opened before the filmstrip is completely wound off the take-up spool, the exposed frames within the cartridge are protected from stray light. However, the film remaining on the take-up spool may be ruined. Therefore, a door-open sensor and a film-on-spool sensor are provided which cooperate with a control circuit, when the rear door is opened, to operate the motorized film transport mechanism to continuously rewind the film on the take-up spool into the cartridge.

6 Claims, 6 Drawing Figures

FILM-ON-SPOOL SENSOR FOR TRIGGERING FILM REWIND WHEN CAMERA DOOR OPENED PREMATURELY

CROSS-REFERENCE TO A RELATED APPLICATION

Reference is made to commonly assigned, copending patent application Ser. No. 861,387 entitled FILM-ON-SPOOL SENSOR FOR CONTROLLING FRAME COUNTER, and filed May 9, 1986 in the name of Stephen Malloy Desormeaux.

BACKGROUND OF THE INVENTION

1. Field of the Invention

The invention relates generally to the field of photographic cameras and in particular to those cameras in which a filmstrip is first prewound from a cartridge onto a take-up spool without exposing any of the frames on the filmstrip and then is rewound one frame at a time back into the cartridge after each exposure is completed.

2. Description of the Prior Art

Typically in a number of 35 mm cameras, there is included a motorized film transport mechanism. In operation, a leading end portion of the filmstrip extending from a light-tight cartridge loaded in the camera is attached automatically to a take-up spool. The take-up spool is rotated after each exposure to advance successive frames of the filmstrip from the cartridge across the focal plane of a taking lens and onto the take-up spool. Each time the take-up spool is rotated, an unexposed frame on the filmstrip is located in the focal plane of the taking lens and an exposed frame is wound onto the take-up spool. At the same time, a frame counter is incremented by rotation of a metering sprocket in engagement with successive perforations in the filmstrip to provide a count of the number of frames exposed or remaining to be exposed on the filmstrip. When the fresh film supply has been exhausted, a trailing end portion of the filmstrip remains attached to a supply spool within the cartridge. This end of film condition is signalled by a sudden rise in the film tension as the take-up spool attempts to withdraw the remainder of the filmstrip from the cartridge. A tension sensing mechanism responds to the increase in film tension by reversing the motor drive to rotate the supply spool within the cartridge. The rotated spool draws the exposed filmstrip off the take-up spool and rewinds it into the cartridge. Then, a rear door of the camera is opened and the cartridge is removed in order to process the filmstrip.

Opening the rear door of the camera, for example, to remove a cartridge containing an exposed filmstrip, usually initializes the frame counter to an original empty setting. When a cartridge with a fresh filmstrip is loaded in the camera and the door is re-closed, the frame counter is incremented from its empty setting to a "1" setting in response to advance of the filmstrip to locate the first frame in the focal plane of the taking lens. Failure to initialize the frame counter to its empty setting before the cartridge with the fresh filmstrip is loaded in the camera would result in the frame count being out of synchronization with the exposed frames on the filmstrip.

If the rear door of the camera is accidentally or inadvertently opened before the filmstrip is completely wound off the take-up spool and back into the cartridge, the exposed frames on the take-up spool may be ruined by stray light. To prevent this occurance, cameras have been recently provided with a motorized film transport mechanism which prewinds substantially the entire length of the filmstrip onto the take-up spool before any exposures are taken. Then, after each exposure, the filmstrip is rewound one frame at a time back into the cartridge. Thus, the exposed frames will be protected within the cartridge from stray light should the rear door be opened prematurely.

The frame counter in a camera that first prewinds a fresh filmstrip onto the take-up spool and then rewinds the filmstrip incrementally into the cartridge after each exposure is driven by rotation of the metering sprocket during film movement in both the prewind and rewind directions. When the filmstrip is moved in the prewind direction, the frame counter is incremented to indicate the maximum number of available exposures. Conversely, movement of the filmstrip in the rewind direction decrements the frame counter once after each exposure to indicate the remaining number of available exposures. Opening the rear door of the camera accidentally or inadvertently before the filmstrip is completely wound off the take-up spool usually initializes the counter to its empty setting. This, presumably, serves as a reminder to the photographer to press a button or to otherwise activate the motorized film transport mechanism to rewind the remainder of the filmstrip back into the cartridge.

It has been suggested in U.S. Pat. No. 4,460,256, granted July 17, 1984, that the filmstrip remaining on the take-up spool in an expose on rewind type camera be automatically rewound into the cartridge should the rear door of the camera be opened prematurely. In this instance, the frame counter is not initialized to its empty setting when the door is opened, but instead remains at its numbered setting above "0". Respective switches in the camera operate to sense that the door is open and that the frame counter is at a numbered setting above "0". This combination of events sensed by the switches triggers energization of a film drive motor in a rewind direction. Then, as the filmstrip is rewound into the cartridge, the frame counter is decremented in accordance with rotation of the metering sprocket. When the frame counter is decremented to a "0" setting, the corresponding switch changes state to de-energize the film drive motor. While this arrangement may perform satisfactorily, it is possible that the filmstrip will slip off the metering sprocket during rewind because the rear door is open and, therefore, the filmstrip is not held in engagement with the metering sprocket. As a result, the frame counter may be decremented to its "0" setting to de-energize the drive motor before the filmstrip is completely wound off the take-up spool. This is due to the fact in the '256 patent that during rewind the metering sprocket is motor driven to decrement the frame counter at a faster speed than the supply spool within the cartridge is motor driven to wind the filmstrip onto the supply spool. Thus, the photographer may have to unwind some of the filmstrip off the take-up spool and hand feed it into the cartridge.

THE CROSS-REFERENCED APPLICATION

The patent application cross-referenced above disclosed an expose on rewind type camera in which, when a rear door is opened accidentally with the filmstrip in midroll, a film-on-spool sensor sensing the presence of the filmstrip on the take-up spool maintains the frame counter in its numbered setting to prevent the counter from being reset to an original empty setting by an initializing spring. This allows the frame counter to continue the frame count after the door is re-closed, should the photographer wish to use any frames remaining on the filmstrip which may not be ruined.

SUMMARY OF THE INVENTION

The invention provides a simpler, more reliable camera apparatus than is described above in connection with the prior art and is different than the camera apparatus disclosed in the cross-referenced application. In particular, the invention provides an improved device for automatically triggering film rewind in an expose on rewind type camera when a camera door is opened prematurely.

According to the invention, there is provided a camera having a motorized film transport mechanism which is operable normally to prewind substantially the entire length of a filmstrip from a light-tight cartridge onto a take-up spool without exposing any of the frames on the filmstrip and to rewind the filmstrip one frame at a time back into the cartridge after each exposure. If a rear door of the camera is accidentally or inadvertently opened before the filmstrip is completely wound off the take-up spool, a door-open sensor and a film-on-spool sensor cooperate with a control circuit to operate the motorized film transport mechanism to rewind the remainder of the filmstrip back into the cartridge. Then, after the take-up spool is emptied, the film-on-spool sensor cooperates with the control circuit to de-energize the transport mechanism. Thus, it is assured that the transport mechanism will not be de-energized before the filmstrip is completely wound off the take-up spool, as contrasted to the prior art described above.

DESCRIPTION OF THE PREFERRED EMBODIMENT

Figure 1:
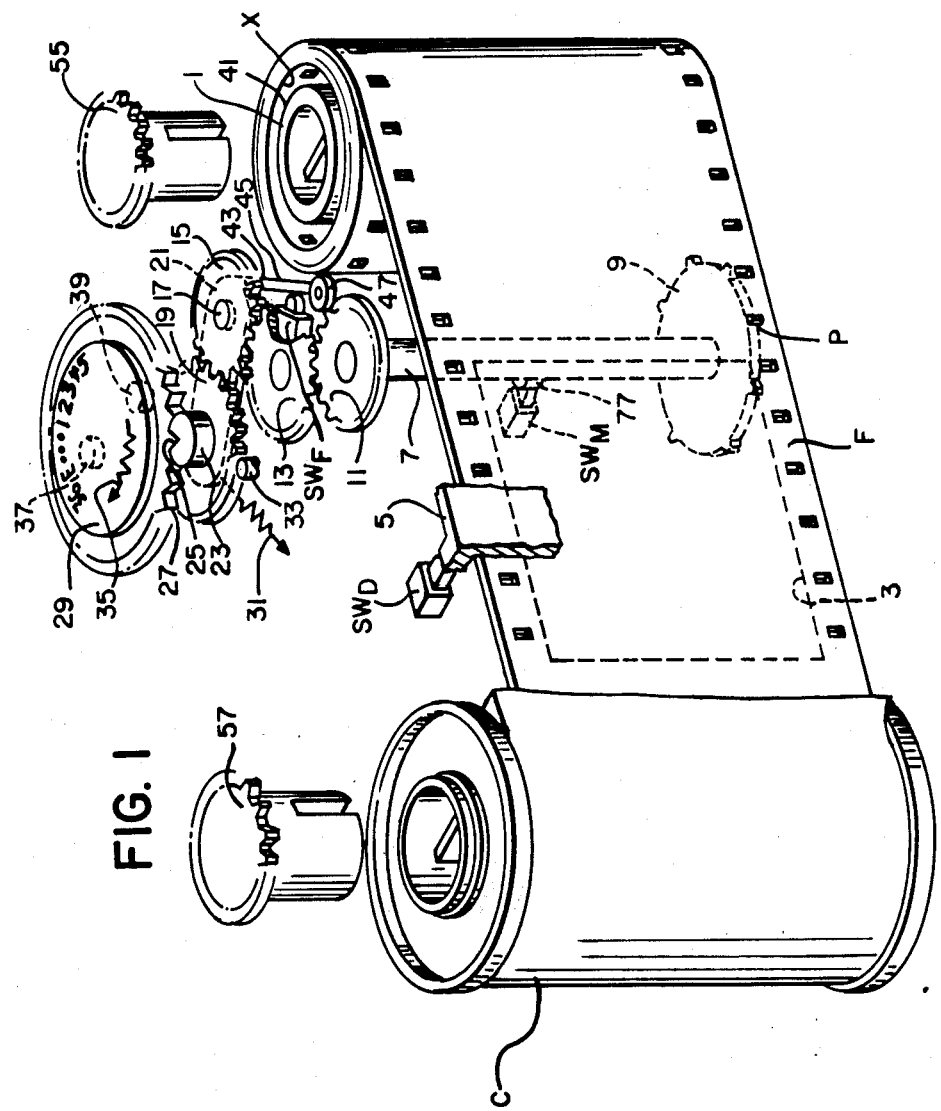
FIG. 1 is a perspective view of an improved apparatus for triggering automatic film rewind when a rear door of a camera is opened prematurely, in accordance with a preferred embodiment of the invention.

The invention is disclosed as being embodied preferably in a 35 mm camera. Because the features of this type camera are well known, the description which follows is directed in particular to photographic elements forming part of or cooperating directly with the disclosed embodiment. It is to be understood, however, that other elements not specifically shown or described may take various forms known to persons or ordinary skill in the art.

In the type of camera to be described those photographic elements shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings.

Referring now to the drawings and in particular to FIG. 1, there is shown certain elements of a 35 mm camera of the type in which substantially the entire length of a filmstrip F is pre-wound from a light-tight film cartridge C onto a take-up spool or drum 1 before any exposures are taken at an aperture 3. Then, after each exposure at the aperture 3, the filmstrip F is rewound one frame at a time back into the cartridge C. This is done to protect the exposed frames on the filmstrip F in the event a rear door 5 of the camera is accidentally or inadvertently opened prematurely, i.e., before the filmstrip is rewound completely into the cartridge.

Figure 2:
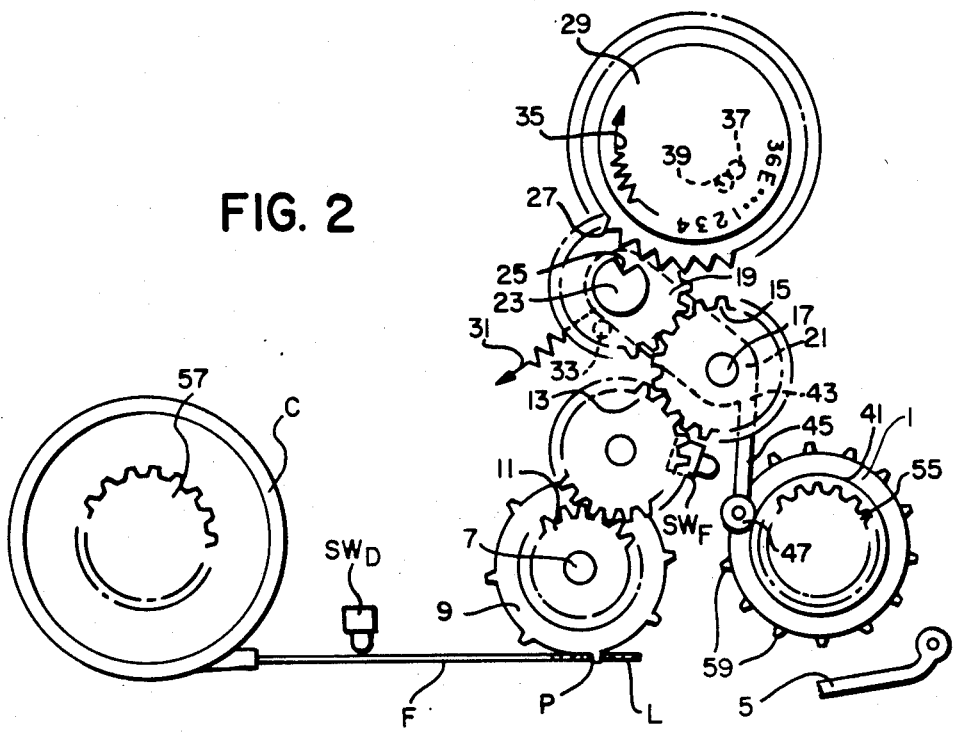
FIG. 2 is a top plan view of the improved apparatus depicted in FIG. 1, shown with the rear door opened.

As shown in FIGS. 1 and 2, a coaxial shaft 7 connects a metering sprocket 9 and a metering gear 11 to enable the sprocket and the gear to rotate in unison. The metering sprocket 9 engages successive perforations P in the filmstrip F as the filmstrip is pre-wound onto the take-up spool 1 and is rewound back into the cartridge C. The metering gear 11 continuously engages an intermediate gear 13 which, in turn, continuously engages a pivot gear 15. The pivot gear 15 is supported for rotation about a pivot shaft 17 and continuously engages a counter gear 19. A swing plate 21 on which the pivot gear 15 and the counter gear 19 are disposed is supported on the shaft 17 for pivotal movement about the shaft without disengaging the pivot gear from the counter gear or the intermediate gear 13. A motion-transmitting stud 23 is coaxially fixed on the counter gear 19 and has a single recess 25 for receiving successive peripheral teeth 27 of a rotatable counter disk 29 to rotate the disk in accordance with rotation of the counter gear. The counter disk 29 is located on the outside of the camera and has thirty-six evenly spaced settings represented by the numbers "1, 2, 3, 4, 5, . . . 36" imprinted on the disk. These numbers correspond to successive frames on the filmstrip F. An original empty setting of the counter disk 29 is represented by the letter "E" imprinted on the disk. This is to indicate that the camera is empty.

When the filmstrip F is pre-wound onto the take-up spool 1, the metering sprocket 9 is rotated by pre-winding movement of the filmstrip to increment the counter disk 29 from its original "E" setting to a maximum number setting, such as the "36" setting or a lesser number setting, to indicate the maximum number of unexposed frames on the filmstrip F. Conversely, as the filmstrip F is rewound back into the cartridge C after each exposure, the metering sprocket 9 is rotated by rewinding movement of the filmstrip to decrement the counter disk 29 one setting at a time from its maximum number setting to indicate the remaining number of unexposed frames on the filmstrip. In operation, the metering sprocket 9, the gears 11, 13, 15, and 19, and the motion-transmitting stud 23 are each rotated one revolution between successive frames.

Normally, as shown in FIG. 2, a relatively light separating spring 31 urges the swing plate 21 to pivot in a counter-clockwise direction about the shaft 17 into abutment against a stop pin 33 on a frame portion of the camera. This will cause the motion-transmitting stud 23 to move out of its position against at least one of the peripheral teeth 27 of the counter disk 29 to thereby release the counter disk. Release of the counter disk 29 allows a relatively light initializing spring 35 to rotate the counter disk to reset the disk to its original "E" setting. A stop pin 37 on the underside of the counter disk 29 will contact a fixed pin 39 on a frame portion of the camera to halt the counter disk at its "E" setting. When the motion-transmitting stud 23 is in its position against at least one of the peripheral teeth 27 of the counter disk 29, the initializing spring 35 is not strong enough to rotate the counter disk. The means for moving the motion-transmitting stud 23 to its position against at least one of the peripheral teeth 27 of the counter disk 29 is described below.

Figure 3:
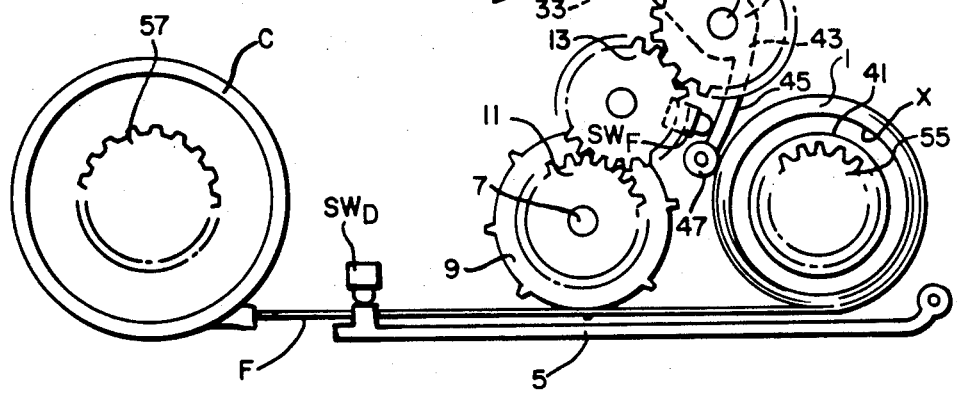
FIG. 3 is a top plan view of the improved apparatus depicted in FIG. 1, shown with the rear door closed.

The take-up spool 1 includes a relieved annular portion 41 on its peripheral edge having a smaller diameter than the remainder of the take-up spool. A film-on-spool sensor 43, integrally formed with the swing plate 21, includes a resiliently flexible sensing finger 45 for sensing the presence and the absence of the filmstrip F on the take-up spool 1. As shown in FIG. 2, the separating spring 31 urges the swing plate 21 to position an idler roller 47 on a free end of the sensing finger 45 in abutment against the relieved annular portion 41 of the take-up spool 1. In this instance, the motion-transmitting stud 23 is removed from its position against at least one of the peripheral teeth 27 of the counter disk 29, and the counter disk is reset to its "E" setting by the initializing spring 35. When a leading end portion L of the filmstrip F is initially wound onto the take-up spool 1, a longitudinal section X of the first convolution of the filmstrip will be spaced opposite the relieved annular portion 41. See FIG. 3. The idler roller 47 will ride on the longitudinal section X, thereby being separated from the relieved annular portion 41. This causes the sensing finger 45 of the film-on-spool sensor 43 to pivot the swing plate 21 in a clockwise direction about the shaft 17 until the motion-transmitting stud 23 is moved to its position against at least one of the peripheral teeth 27 of the counter disk 29. If the rear door 5 of the camera is accidentally or inadvertently opened when the filmstrip F is wound at least partly on the take-up spool 1, the counter disk 29 cannot be reset to its original "E" setting by the return spring 35 because the motion-transmitting stud 23 remains in its position against at least one of the peripheral teeth 27 of the counter disk.

Figure 4:
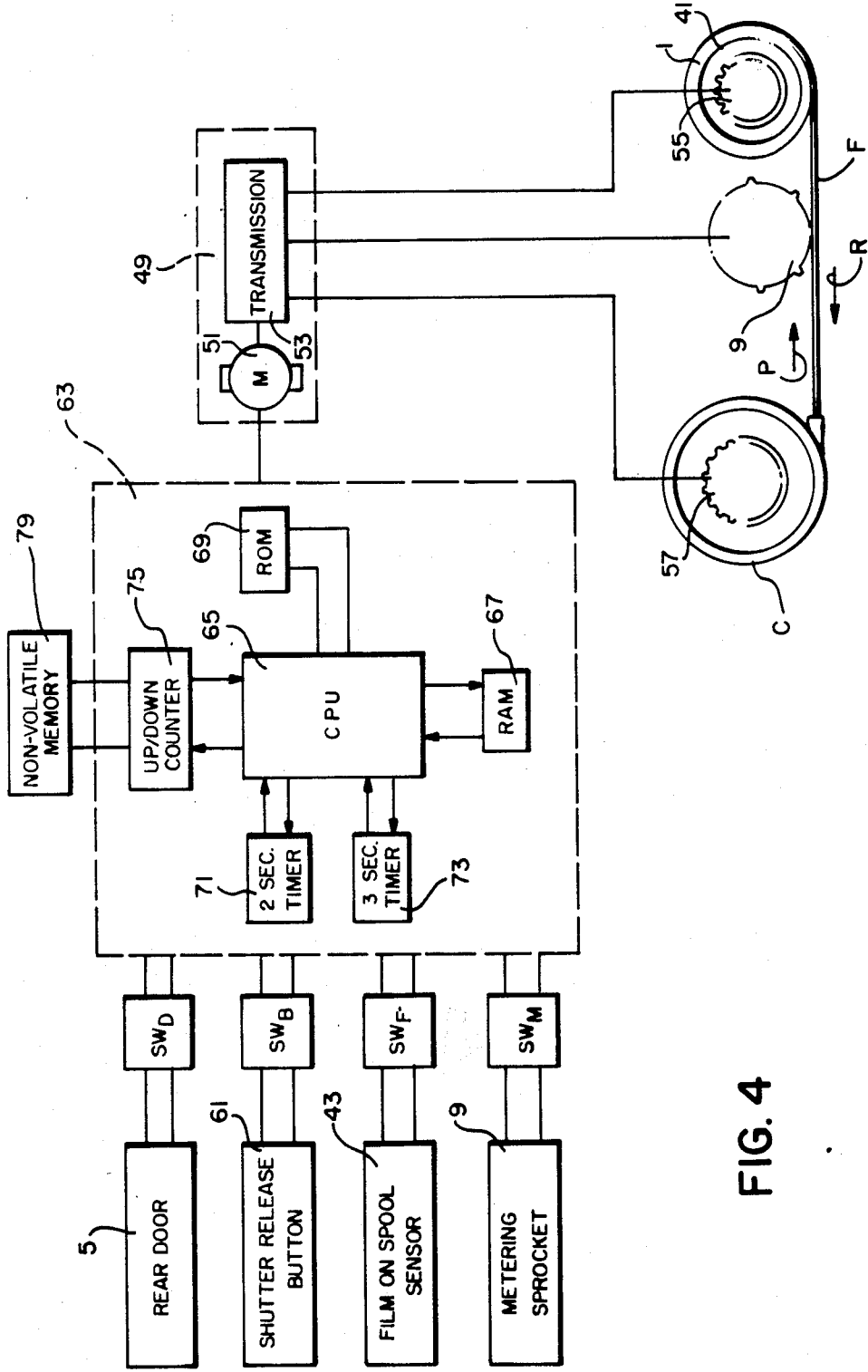
FIG. 4 is a schematic representation of a control circuit included in the improved apparatus.

In FIG. 4, there is schematically depicted a motorized film transport mechanism 49 comprising a conventional bi-directional motor 51 and a conventional drive transmission 53. As shown, the transmission 53 is coupled to the metering sprocket 9 and to respective drive hubs 55 and 57 which engage the take-up spool 1 and a supply spool within the cartridge C. When the cartridge C is loaded in the camera, as shown in FIG. 2, the leading end portion L of the filmstrip F is placed over the metering sprocket 9 to position one or more successive perforations P in the leading end portion in engagement with the sprocket. The motorized film transport mechanism 49 initially rotates the metering sprocket 9 in order to advance the leading end portion L of the filmstrip F onto the take-up spool 1. The take-up spool 1 has respective teeth 59 for engaging the successive perforations P in the leading end portion L of the filmstrip F and is rotated by the motorized transport mechanism 49 at a faster speed than the metering sprocket 9. A film tension responsive clutch in the transmission 53 de-couples the metering sprocket 9 from its rotational drive in response to the resulting pull on the filmstrip F caused by engagement of the leading end portion L of the filmstrip to the faster rotating take-up spool 1. Thereafter, the metering sprocket 9 operates in an idling capacity, that is, it is rotated by movement of the filmstrip F from the cartridge C onto the take-up spool 1 and back into the cartridge.

As shown in FIG. 4, there are provided respective switches $SW_D$, $SW_B$, $SW_F$, and $SW_M$ operatively associated with the rear door 5, a shutter release button 61, the film-on-spool sensor 43, and the metering sprocket 9. In turn, the switches $SW_D$, $SW_B$, $SW_F$, and $SW_M$ are connected to a conventional digital microcomputer 63 such as used in many cameras. The microcomputer 63 includes a central processing unit (CPU) 65, a random access memory (RAM) 67, a read only memory (ROM) 69, a two second timer 71, a three second timer 73, and an up/down counter 75. As is described below, the microcomputer 63 is used to control operation of the motorized film transport mechanism 49 to prewind the filmstrip F onto the take-up spool 1 and to rewind the filmstrip back into the cartridge C. The switch $SW_D$ is open when the rear door 5 is closed and is closed when the rear door is opened. The switch $SW_B$ is closed each time the shutter release button 61 is depressed by the photographer to initiate a film exposure and is opened when the button is released. The switch $SW_F$ is closed by the sensing finger 45 of the film-on-spool sensor 43 when the sensing finger is moved away from the take-up spool 1 in response to pre-winding of the leading end portion L of the filmstrip F onto the spool and is opened when the sensing finger returns to the spool once the filmstrip is completely wound off the spool. The switch $SW_M$ is closed by a cam 77 on the coaxial shaft 7 fixed to the metering sprocket 9, as shown in FIG. 1, each time the sprocket is rotated a single revolution. When the metering switch $SW_M$ is closed, a metering pulse is generated in the microcomputer 63. The metering pulse is counted up in the up/down counter 75 during pre-winding movement of the filmstrip F, to increment the counter by "1", and is counted down during rewinding movement of the filmstrip, to similarly decrement the counter. A non-volatile memory 79 or other means, such as back-up battery, is provided to maintain the pulse count in the counter 75 when the camera is shut down and any film is present on the take-up spool 1.

Operation

Figure 5A:
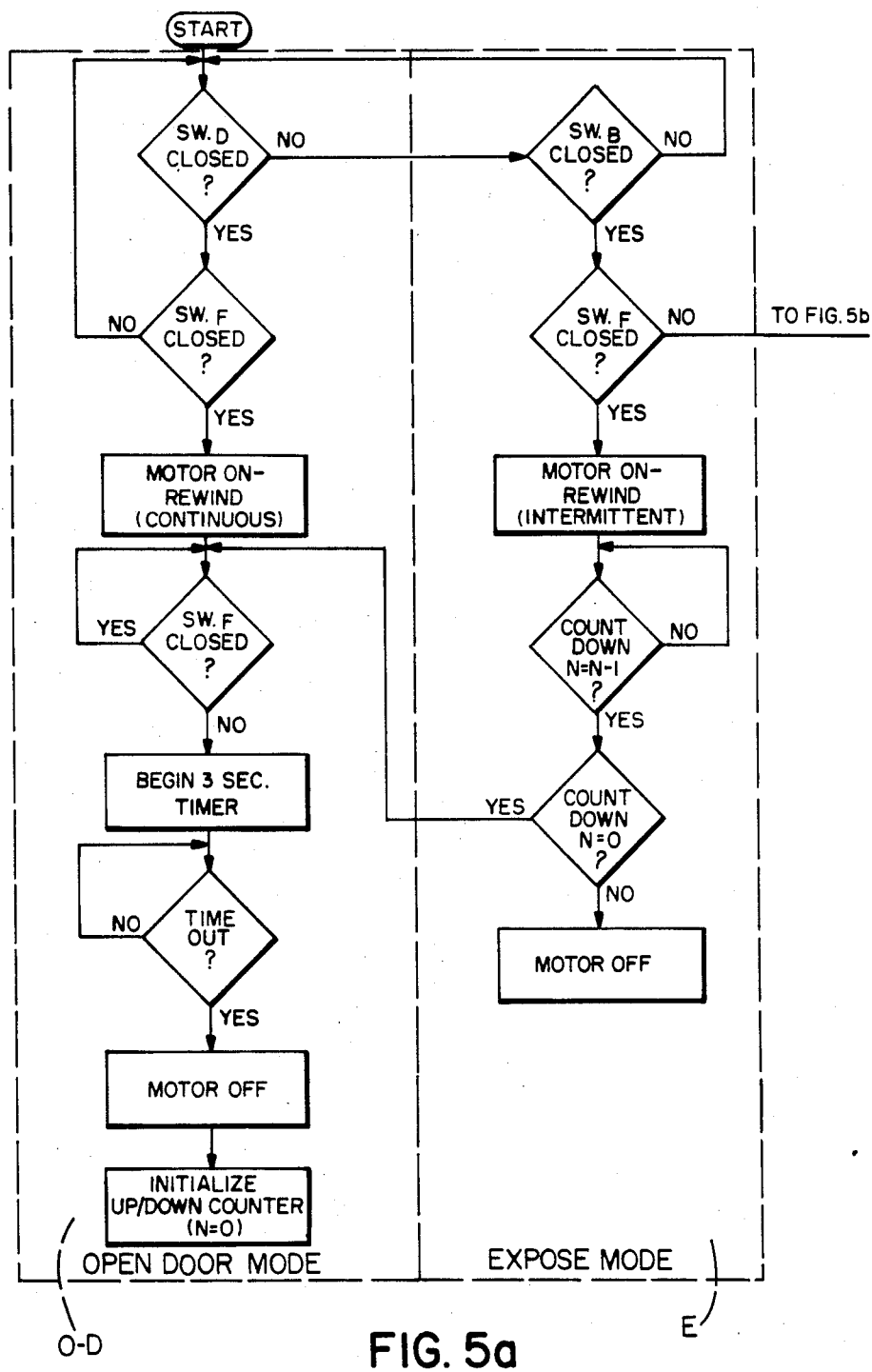
FIGS. 5a and 5b together form a flow chart illustrating operation of the control circuit.
Figure 5B:
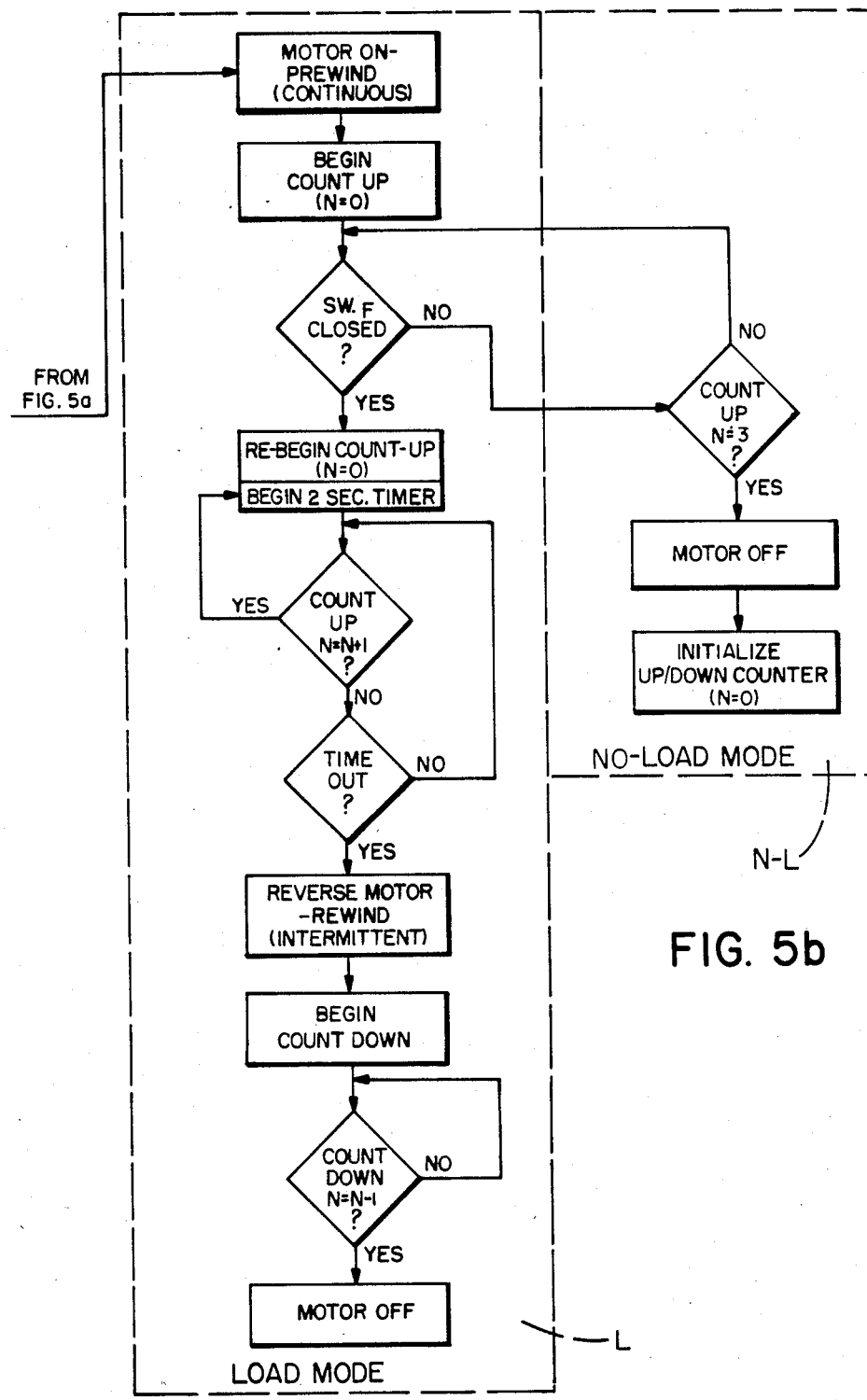

FIGS. 5a and 5b together form a flow chart which illustrates four routines of the microcomputer 63 which are effected in cooperation with the switches $SW_D$, $SW_B$, $SW_F$, and $SW_M$ to control operation of the motorized film transport mechanism 49.

(1) Load Mode

This mode corresponds to the routine L of the microcomputer 63. If the switch $SW_D$ is open because the rear door 5 is closed, the switch $SW_B$ is closed because the shutter release button 61 is depressed, and the switch $SW_F$ is open because no film is present on the take-up spool 1, the motor 31 is energized to drive the transmission 53 in a pre-wind direction for film movement as depicted by the arrow P in FIG. 4. At this time, the transmission 53 rotates the metering sprocket 9 and the drive hub 55 for rotating the take-up spool 1. The drive hub 57 for rotating the supply spool within the cartridge C is disconnected from the transmission 53, allowing the supply spool to idle. After the motor 31 is energized, the up/down counter 75 begins to count up from "0" by "1" each time a metering pulse is produced in response to closing of the switch $SW_M$ when the metering sprocket 9 completes a single revolution. If the switch $SW_F$ is closed because the leading end portion L of the filmstrip F has been wound onto the take-up spool 1, the two sec. timer 71 is begun and the counter 75 re-begins its count-up from "0". The substantial length of the filmstrip F, following the leading end portion L, is then pre-wound onto the take-up spool 1. If the counter 75 is incremented by "1" before the two sec. timer 71 times out, the timer is begun again. After the substantial length of the filmstrip F has been pre-wound onto the take-up spool 1, the take-up spool is prevented from withdrawing the remainder of the filmstrip from the cartridge C because a trailing end portion of the filmstrip is attached to the supply spool within the cartridge. This end of film condition causes film movement to stall. As a result, the counter 75 is not incremented by "1" before the two sec. timer 71 times out. This causes the motor 51 first to be de-energized and then to be re-energized in an opposite direction to drive the transmission 53 in a rewind direction for film movement as depicted by the arrow R in FIG. 4. The reversed transmission 53 pivots a gear or the like into driving relation with the drive hub 57 for the supply spool within the cartridge C, causing the hub and the spool to be rotated by the transmission. Simultaneously, the counter 75 begins a countdown of the metering pulses from its total count obtained during pre-winding. When the counter 75 is decremented by "1", the first frame of the filmstrip F will be in the focal plane of the taking lens. Then, the motor 51 is de-energized, thereby concluding the load mode L.

(2) No-Load Mode

This mode corresponds to the routine N-L of the microcomputer 63. If, in the load mode L, the switch $SW_F$ is open because the leading end portion L of the filmstrip F is not wound onto the take-up spool 1 after the motor 51 is energized to drive the transmission 53 in the pre-wind direction and if, in the no-load mode N-L, the up/down counter 75 counts up to "3", but the switch $SW_F$ has not closed because the take-up spool remains empty, the motor is de-energized and the counter is reset to "0", thereby concluding the no-load mode.

(3) Expose Mode

This mode corresponds to the routine E of the microcomputer 63. If the switch $SW_D$ is open because the rear door 5 is closed, the switch $SW_B$ is closed because the shutter release button 61 is depressed, and the switch $SW_F$ is closed because film is present on the take-up spool 1, the motor 31 is energized to drive the transmission 53 in the rewind direction. As a result, the supply spool within the cartridge C is rotated by the drive hub 57 to rewind an exposed frame into the cartridge, and the take-up spool 1 is rotated by the drive hub 55 to advance a fresh frame off the take-up spool and into the focal plane of the taking lens. When the up/down counter 75 is decremented by "1", but the counter has not dropped to "0", the motor 51 will be de-energized, thereby concluding the exposure mode E. Otherwise, if the counter 75 has dropped to "0", then, when the switch $SW_F$ is closed because the filmstrip F has been completely wound off the take-up spool, the three sec. timer 73 is begun. When the three sec. timer 73 times out, the leading end portion L of the filmstrip F will have been rewound into the cartridge C. Then, the motor 51 is de-energized and, merely as a precaution, the counter 75 is re-initialized, thereby concluding the exposure mode.

(4) Open Door Mode

This mode corresponds to the routine O-D of the microcomputer 63. If the switch $SW_D$ is closed because the rear door 5 is opened, but the switch $SW_F$ is closed because film is present on the take-up spool 1, the motor 51 is energized to drive the transmission 53 in the rewind direction. Then, only when the switch $SW_F$ is opened because the filmstrip F has been completely wound off the take-up spool 1, the three sec. timer 73 is begun. When the three sec. timer 73 times out, the leading end portion L of the filmstrip F will have been rewound into the cartridge C. Then, the motor 51 is de-energized and, merely as a precaution, the counter 75 is re-initialized, thereby concluding the open door mode.

The invention has been described with reference to a preferred embodiment. However, it will be appreciated that variations and modifications can be effected within the ordinary skill in the art without departing from the scope of the invention. For example, a combination of logic gates or switching circuits which make digital decisions may be used in controlling operation of the motorized film transport mechanism 49. In another example, a tension sensing member responsive to the sudden increase in film tension arising at the end of pre-winding, when the take-up spool 1 attempts to withdraw the remainder of the filmstrip F from the cartridge C, may be used to reverse the motor 51. In a third example, the up/down counter 75 may be connected to a decoder which, in turn, is connected to a liquid crystal display or a light emitting diode array to provide an indication of the frame count.

I claim:

1. An improved photographic camera of the type wherein (a) a door is openable to load a light-tight cartridge containing an unexposed filmstrip into said camera and (b) motorized film transport means is operable normally to prewind substantially the entire length of the filmstrip from the cartridge onto a take-up spool without exposing any of the frames on the filmstrip and to rewind the filmstrip one frame at a time back into the cartridge after each exposure is completed, and wherein the improvement comprises:
   first sensing means for sensing that said door is open;
   second sensing means for sensing the presence of substantially any filmstrip wound on said take-up spool; and
   Control means cooperating with said first and second sensing means in response to said door being opened when substantially any filmstrip is wound on said take-up spool, for operating said film transport means to continuously rewind the filmstrip remaining on said spool back into the cartridge.

2. The improvement as recited in claim 1, wherein said second sensing means includes a sensing member normally urged into abutment against said take-up spool and mounted for movement away from the spool by the winding of substantially any filmstrip onto said spool.

3. An improved photographic camera of the type wherein (a) a door is openable to load a light-tight cartridge containing an unexposed filmstrip into said camera and (b) motorized transport means is operable normally to prewind substantially the entire length of the filmstrip from the cartridge onto a take-up spool without exposing any of the frames on the filmstrip and to rewind the filmstrip one frame at a time back into the cartridge after each exposure is completed, and wherein the improvement comprises:

first sensing means for sensing that said door is open;

second sensing means for sensing the presence of substantially any filmstrip wound on said take-up spool and for sensing that said spool is empty; and control means cooperating with said first and second sensing means initially in response to said door being opened when substantially any filmstrip is wound on said take-up spool, for operating said film transport means to continuously rewind the filmstrip remaining on said spool back into the cartridge, and then in response to said spool being empty, for discontinuing operation of said film transport means.

4. An improved photographic camera of the type wherein (a) a door is openable to load a light-tight cartridge containing an unexposed filmstrip into said camera, (b) motorized film transport means is operable to continuously prewind substantially the entire length of the filmstrip from the cartridge onto a take-up spool without exposing any of the frames on the filmstrip and to intermittently rewind the filmstrip one frame at a time back into the cartridge after each exposure is completed, and (c) a frame counter is incremented during prewinding of the filmstrip onto said take-up spool to provide a count of the maximum number of frames to be exposed and is decremented during rewinding of the filmstrip back into the cartridge to provide a count of the remaining number of frames to be exposed, and wherein the improvement comprises:

first sensing means for sensing that said door is open;

second sensing means urged into abutment against said take-up spool for sensing the absence of substantially any filmstrip on the spool and mounted for movement away from said spool by the winding of the filmstrip onto the spool;

means cooperating with said first and second sensing means in response to said door being opened when substantially any filmstrip is wound on said take-up spool, for operating said film transport means to continuously rewind the filmstrip remaining on said spool back into the cartridge;

means cooperating with said second sensing means in response to the absence of substantially any filmstrip on said take-up spool, for initializing said frame counter.

5. An improved photographic camera of the type wherein (a) a normally closed door is openable to load a light-tight cartridge containing an unexposed filmstrip into said camera and (b) motorized film transport means is operable to continuously prewind substantially the entire length of the filmstrip from the cartridge onto a take-up spool without exposing any of the frames on the filmstrip and to intermittently rewind the filmstrip one frame at a time back into the cartridge after each exposure is completed, and wherein the improvement comprises:

first switching means responsive to said door being opened and closed for changing to first and second states, respectively;

second switching means responsive to the presence and the absence of substantially any filmstrip on said take-up spool for changing to first and second states, respectively; and control means cooperating with said first and second switching means initially in response to said first switching means changing to its first state when said second switching means is in its first state, for operating said film transport means to continuously rewind substantially any filmstrip on said take-up spool back into the cartridge, and then in response to said second switching means changing to its second state, for discontinuing operation of said film transport means.

6. An improved photographic camera of the type wherein (a) a normally closed door is openable to load a light-tight cartridge containing an unexposed filmstrip into said camera and (b) motorized film transport means is operable to continuously prewind substantially the entire length of the filmstrip from the cartridge onto a take-up spool without exposing any of the frames on the filmstrip and to intermittently rewind the filmstrip one frame at a time back into the cartridge after each exposure is completed; and wherein the improvement comprises:

first switching means responsive to said door being opened and closed for changing to first and second states, respectively;

second switching means responsive to the presence and the absence of substantially any filmstrip on said take-up spool for changing to first and second states, respectively; and control means cooperating with said first and second switching means when each of said switching means are in their second states, for operating said motorized film transport to continuously prewind substantially the entire length of a filmstrip onto said take-up spool, when said first switching means is in its second state and said second switching means is in its first state, for operating said motorized film transport to intermittently rewind the filmstrip back into the cartridge, and when said first and second switching means are each in their first states, for operating said motorized film transport to continuously rewind the filmstrip back into the cartridge.

* * * * *